US011927127B1

(12) United States Patent
Burch

(10) Patent No.: US 11,927,127 B1
(45) Date of Patent: Mar. 12, 2024

(54) DUAL SPRAY PISTON COOLING JET DEVICE

(71) Applicant: S&S CYCLE, INC., Viola, WI (US)

(72) Inventor: Gavin Burch, Lone Rock, WI (US)

(73) Assignee: S&S CYCLE, INC., Viola, WI (US)

( * ) Notice: Subject to any disclaimer, the term of this patent is extended or adjusted under 35 U.S.C. 154(b) by 0 days.

(21) Appl. No.: 18/298,722

(22) Filed: Apr. 11, 2023

(51) Int. Cl.
*F01P 3/08* (2006.01)
*F01P 3/06* (2006.01)
*B05B 1/06* (2006.01)
*F01M 1/08* (2006.01)

(52) U.S. Cl.
CPC *F01P 3/08* (2013.01); *F01P 3/06* (2013.01); *B05B 1/06* (2013.01); *F01M 1/08* (2013.01)

(58) Field of Classification Search
CPC .......... F01P 3/08; F01P 3/06; F01P 2003/006; B05B 1/06; B05B 1/302; F01M 1/08
See application file for complete search history.

(56) References Cited

U.S. PATENT DOCUMENTS 4,206,726 A 6/1980 Johnson, Jr. et al.
10,704,450 B2 * 7/2020 Mark ...................... B05B 1/302
2005/0092265 A1 * 5/2005 Dunbar ..................... F01P 3/10 123/41.35
2006/0169224 A1 * 8/2006 Lenz ........................ F01M 1/08 123/196 AB

OTHER PUBLICATIONS

Caterpillar "Oil Jet Tube," Part No. 166-3650, https://vault.netvoyage.com/neWeb2/gold.aspx?id=4862-3451-7070&open=Y, 1 page. Accessed Feb. 2, 2023.
S&S Cycle "Piston Cooling Jet Kit," Part No. 31-2026, https://vault.netvoyage.com/neWeb2/gold.aspx?id=4889-3564-8846&open=Y, 1 page. Accessed Feb. 2, 2023.
2017 Harley-Davidson Parts Catalog: Police Models, https://vault.netvoyage.com/neWeb2/gold.aspx?id=4853-7160-2254&open=Y, 6 pages (pp. 24, 25, 232, 233, 334, 400). Accessed Feb. 2, 2023.
2018 Harley-Davidson Parts Catalog: FLHXSE Model, https://vault.netvoyage.com/neWeb2/gold.aspx?id=4858-7511-5342&open=Y, 5 pages (pp. 24, 25, 328, 329, 396). Accessed Feb. 2, 2023.
2018 Harley-Davidson Parts Catalog: Softail Models, https://vault.netvoyage.com/neWeb2/gold.aspx?id=4886-7671-3806&open=Y, 5 pages (pp. 30, 31, 375, 677, 764). Accessed Feb. 2, 2023.
2018 Harley-Davidson Parts Catalog: Touring Models, https://vault.netvoyage.com/neWeb2/gold.aspx?id=4875-0237-4222&open=Y, 4 pages (pp. 40, 41, 699, 814). Accessed Feb. 2, 2023.

(Continued)

*Primary Examiner* — Syed O Hasan
(74) *Attorney, Agent, or Firm* — Husch Blackwell LLP

(57) ABSTRACT

Piston cooling jet devices, or spray jet devices, for spraying oil onto an underside of a piston are provided. The spray jet devices may include two or more orifices such that oil is directed at an intake side portion and an exhaust side portion of the piston when the spray jet devices are selectively coupled to an engine. The spray jet devices may further include a valve to selectively control the flow of oil through a fluid passageway to the two or more orifices. For example, a check valve may be positioned and located such that the spray jet devices do not spray oil when the pressure of the oil system is less than a threshold value.

22 Claims, 7 Drawing Sheets

(56) References Cited

OTHER PUBLICATIONS

2020 Harley-Davidson Parts Catalog: FXDRS Model, https://vault.netvoyage.com/neWeb2/gold.aspx?id=4864-6225-2366&open=Y, 4 pages (pp. 24, 25, 208, 255). Accessed Feb. 2, 2023.
2020 Harley-Davidson Parts Catalog: Softail Models, https://vault.netvoyage.com/neWeb2/gold.aspx?id=4865-7982-3950&open=Y, 4 pages (pp. 32, 33, 513, 606). Accessed Feb. 2, 2023.
Chester Harley-Davidson, "Piston Jet ASY, Rear W/Gasket", https://estore.chester-harley-davidson.co.uk/62700117-piston-jet-asyrear-w-gasket-p129500.html, 1 page. Accessed Jul. 11, 2023.
Chester Harley-Davidson, "Piston Jet ASY,Front W/Gasket", https://estore.chester-harley-davidson.co.uk/62700089-piston-jet-asyfront-w-gasket-p129499.html, 1 page. Accessed Jul. 11, 2023.

* cited by examiner

DUAL SPRAY PISTON COOLING JET DEVICE

BACKGROUND OF THE INVENTION

The field of the present invention relates generally to spray jet devices and particularly to dual spray piston cooling jet devices.

In reciprocating engines, friction between the piston and the cylinder may generate excess heat in the piston and the cylinder. In internal combustion reciprocating engines, the combustion process may also generate heat in the piston and the cylinder. Excess heat in the piston and cylinder may lead to scored cylinders, piston seizures, or connecting rod fractures. To address these issues, piston cooling jet devices (e.g., part number 31-2026 manufactured by S&S Cycle) for spraying a stream of oil onto an underside of the piston head are known in the art.

However, such devices are not without deficiencies. For example, known piston cooling jet devices generally only produce a single stream of oil which is directed at an exhaust side portion of the piston. As a result, known piston cooling jet devices may be inefficient at cooling the intake side portion of the piston.

Known piston cooling jet devices which produce a plurality of streams of oil include an external tube or hose for each stream of oil. The external tubes are prone to damage or manufacturing inconsistencies. As a result, known piston cooling jet devices which produce a plurality of streams are generally imprecise at directing oil towards the various portions of the piston, and thus, inefficient at cooling the piston.

Additionally, known piston cooling jet devices do not include means for controlling the flow of oil from the engine's oil supply system. More particularly, known piston cooling jet devices spray oil when the engine is started and the piston is relatively cool. During start-up of the engine, the engine's oil pump may supply oil at a lower flowrate and pressure compared to steady-state operation. As a result, the unnecessary oil consumption of the known piston cooling jet devices may deplete the engine's oil supply system and "starve" critical components from oil during start-up of the engine.

Thus, a need exists for an improved piston cooling jet device that produces a plurality of streams of oil. A need also exists for a piston cooling jet with means for controlling the flow of oil during start-up of the oil pump.

BRIEF SUMMARY OF THE INVENTION

The present invention is directed generally to piston cooling jet devices or spray jet devices which discharge oil from two or more orifices. The spray jet devices of the present invention can be coupled to an engine to spray oil onto an exhaust side portion and an intake side portion of a piston.

According to one embodiment of the present invention, a spray jet device may include a main body portion, a main protrusion axially extending from the main body portion, a fluid passageway formed in the main protrusion and extending in the axial direction from a first end proximate the main body portion to a second end, and a first branch and a second branch formed as cavities in the main protrusion. The first branch and the second branch can extend outwardly from the fluid passageway in a radial direction proximate to a second end of the fluid passageway. In one embodiment, the main protrusion is integrally formed with the main body portion.

An angle defined between a centerline of the central axis of the first branch and a centerline of the central axis of the second branch can be between about 15 degrees and about 45 degrees. In one embodiment, the spray jet device includes a check valve positioned and located in the fluid passageway. It will be appreciated that the fluid passageway can further include a first diameter proximate to the first end and a second diameter proximate to the second end, wherein the first diameter is larger than the second diameter. The second end of the fluid passageway may include a pointed tip. In one embodiment, the first branch may terminate at a first outer surface positioned and located on the main protrusion.

According to another embodiment, a spray jet device includes a body portion having a front surface and a rear surface, a protrusion extending outwardly from the front surface, a fluid passageway formed as a cavity in the protrusion and the body portion, a check valve positioned and located in the fluid passageway, at least one branch formed as a cavity in the protrusion and extending from the fluid passageway to an outer surface of the protrusion, and a fluid reservoir formed as a pocket in the rear surface and extending from the fluid reservoir to the fluid passageway. In such a spray jet device, the fluid reservoir can be a hemispherical cavity, and the channel can include a semi-circular cross-section that extends between the fluid reservoir and the fluid passageway. In one embodiment, the spray jet device can include a plurality of branches extending from the fluid passageway. The check valve can include a valve diameter, and the fluid passageway can include an inner diameter proximate to the body portion and an outer diameter proximate to the at least one branch, wherein the valve diameter is smaller than the inner diameter but larger than the outer diameter. In one embodiment, an angle between a vertical reference line and a centerline of the central axis of the at least one branch is between about −5 degrees and about 30 degrees. In one embodiment, the body portion can include at least one counterbored hole for receiving a fastener.

According to yet a further embodiment, a piston mechanism includes a cylinder, a piston having an intake side portion and an exhaust side portion movable in the cylinder between a top-dead-center position and a bottom-dead-center position, and a spray jet device having a main body portion, a main protrusion extending outwardly from the main body portion, and first and second orifices positioned and located on the main protrusion, wherein when the piston is in the top-dead-center position, the first orifice may be directed generally at the exhaust side portion of the piston and the second orifice may be directed generally at the intake side portion of the piston. In one embodiment, when the piston is in the bottom-dead-center position, the first orifice or the second orifice is directed at the intake side portion or the exhaust side portion of the cylinder. The spray jet device can spray fluid from the first orifice and the second orifice onto an underside of the piston to cool the piston. In one embodiment, the first orifice and the second orifice are positioned and located approximately equidistant from the main body portion. The spray jet device can further include a check valve upstream of the first orifice and the second orifice. In one embodiment, the spray jet device includes at least one fastening hole to couple the main body portion to the cylinder. It will be appreciated that the main protrusion of the spray jet device can be integrally formed with the main body portion.

Objects and advantages pertaining to the spray jet devices may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE SEVERAL VIEWS OF THE DRAWINGS

In the accompanying drawings, which form a part of the specification and are to be read in conjunction therewith in, like reference numerals are used to indicate like or similar parts in the various views.

DETAILED DESCRIPTION OF THE INVENTION

Figure 1A:
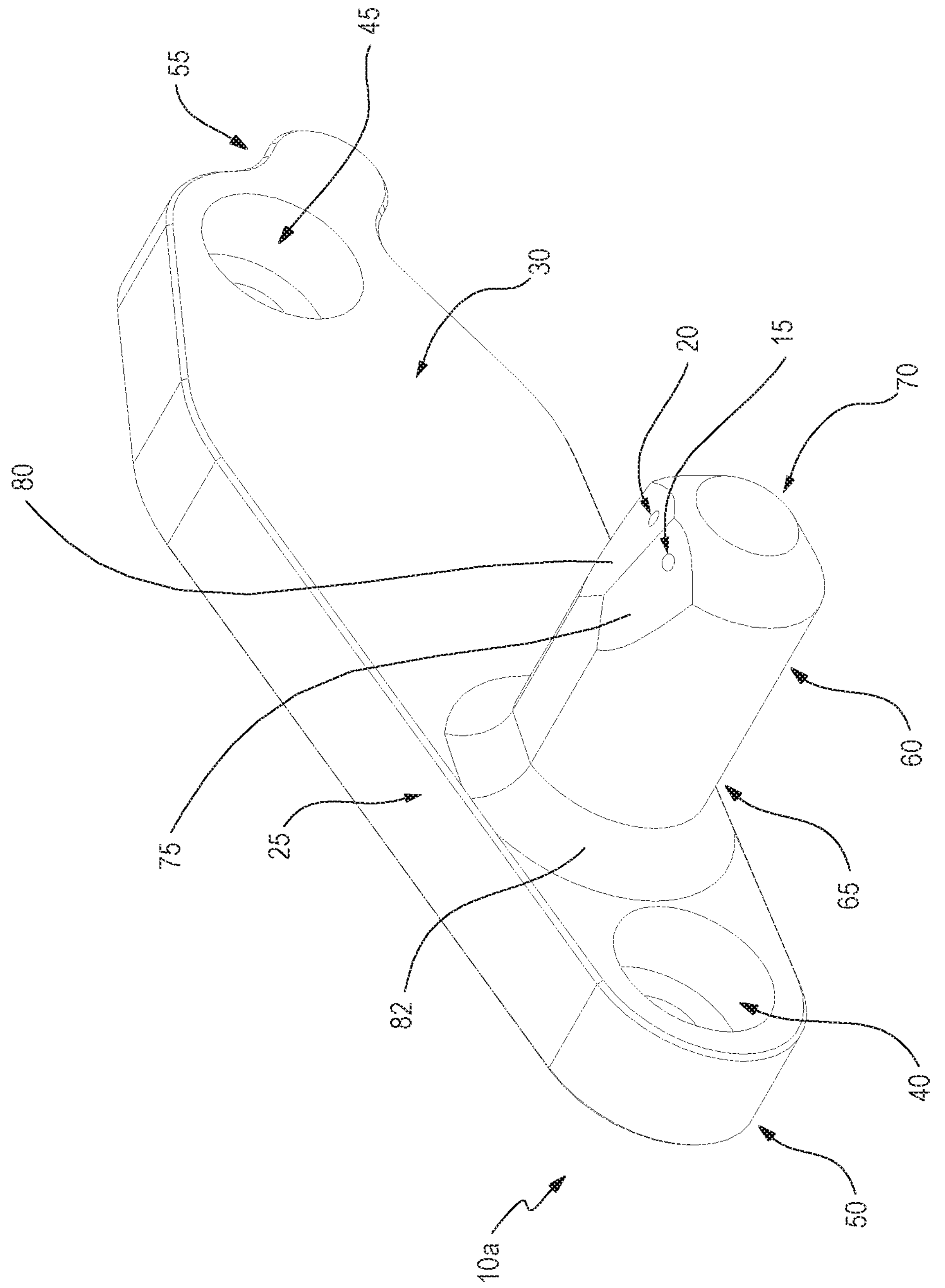
FIG. 1A is a perspective view of a piston cooling jet device in accordance with an embodiment of the present invention.

Various embodiments of the present invention are described and shown in the accompanying materials, descriptions, instructions, and drawings. For purposes of clarity in illustrating the characteristics of the present invention, proportional relationships of the elements have not necessarily been maintained in the drawings. It will be understood that any dimensions included in the drawings are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is directed generally to piston cooling jet devices and specifically, to dual spray piston cooling jet devices. As illustrated and described herein, each of the dual spray piston cooling jet devices, or spray jet devices, can include two or more orifices for spraying oil onto an underside of a piston. The dual spray piston cooling jet devices can also be adapted to control the flow of oil through the orifices. For example, as illustrated and described herein, the dual spray piston cooling jet devices can be adapted to receive a valve, such as a check valve.

While the following description and referenced figures herein describe and illustrate the dual spray piston cooling jet devices of the present invention in use with a motorcycle engine, it is also recognized that the dual spray piston cooling jet devices may also be suitably configured and used with any number of other reciprocating-type engines, including without limitation, automotive engines, heavy machinery engines, marine engines, or diesel generator engines.

Turning to FIGS. 1-6, spray jet devices 10*a* and 10*b* are illustrated in accordance with one embodiment of the present invention. As illustrated throughout FIGS. 1-6, the spray jet devices 10*a* and 10*b* each include a first aperture, outlet, nozzle, or orifice 15 and a second aperture, outlet, nozzle, or orifice 20 for spraying oil. In alternative embodiments, the spray jet devices 10*a* and 10*b* may include more than two orifices for spraying oil.

As also illustrated throughout FIGS. 1-6, the spray jet devices 10*a* and 10*b* each preferably include a base portion, bracket portion, or main body portion 25 adapted for interfacing with an engine. Each of the main body portions 25 may be formed as a substantially flat body with a front surface 30 and a rear surface 35, although other geometries (e.g., hemispherical-body, spherical body) for the main body portions 25 are contemplated. In particular, the rear surfaces 35 may be designed to match a profile on a selected engine, and thus, may be adapted for interfacing with any engine.

To selectively couple the spray jet devices 10*a* and 10*b* to an engine (see e.g., FIGS. 5 and 6), each of the main body portions 25 may include a first fastening hole 40 and a second fastening hole 45 positioned and located proximate a first end 50 and a second end 55 respectively. The first fastening holes 40 and the second fastening holes 45 each may be adapted to receive a fastener (e.g., machine screw, bolt, rivet, etc.). Additionally, the fastening holes 40 and 45 may be provided as counterbored holes. In alternative embodiments, the fastening holes 40 and 45 may be countersunk holes or threaded holes. In yet other alternative embodiments, the main body portion 25 may include more or fewer fastening holes.

Extending outwardly from the front surface 30 of the main body portion 25, each of the spray jet devices 10*a* and 10*b* may include an extension, projection, or main protrusion 60. Each of the main protrusions 60 may extend in an axial direction from a proximal end 65 at the main body portion 25 to a distal end 70, opposite the main body portion 25. Each of the main protrusions 60 may be substantially cylindrical, although other shapes (e.g., rectangular-prisms, free-formed-bodies) are contemplated.

Figure 1B:
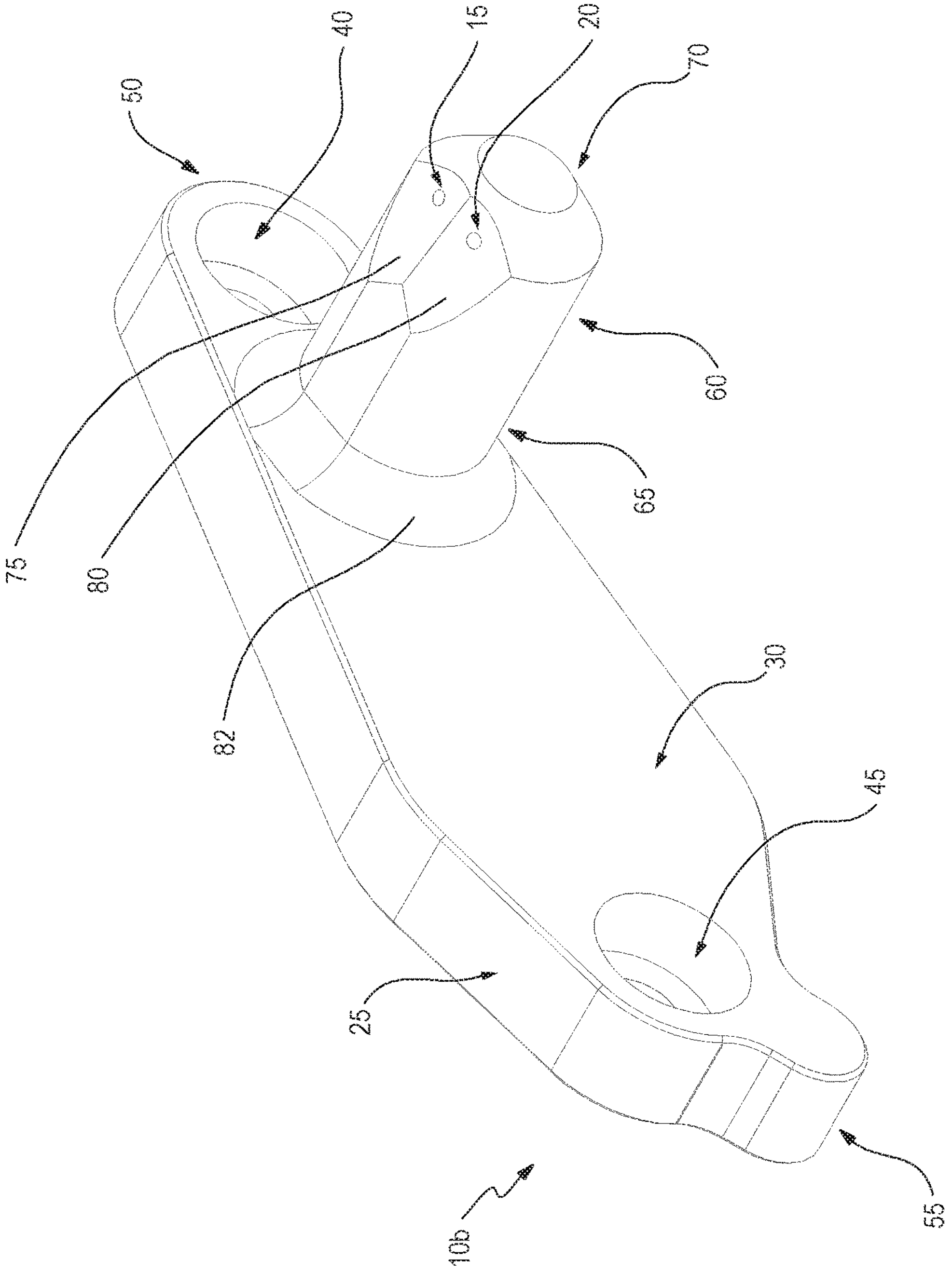
FIG. 1B is a perspective view of another piston cooling jet device which is a mirror image of the piston cooling jet device illustrated in FIG. 1A.
Figure 2:
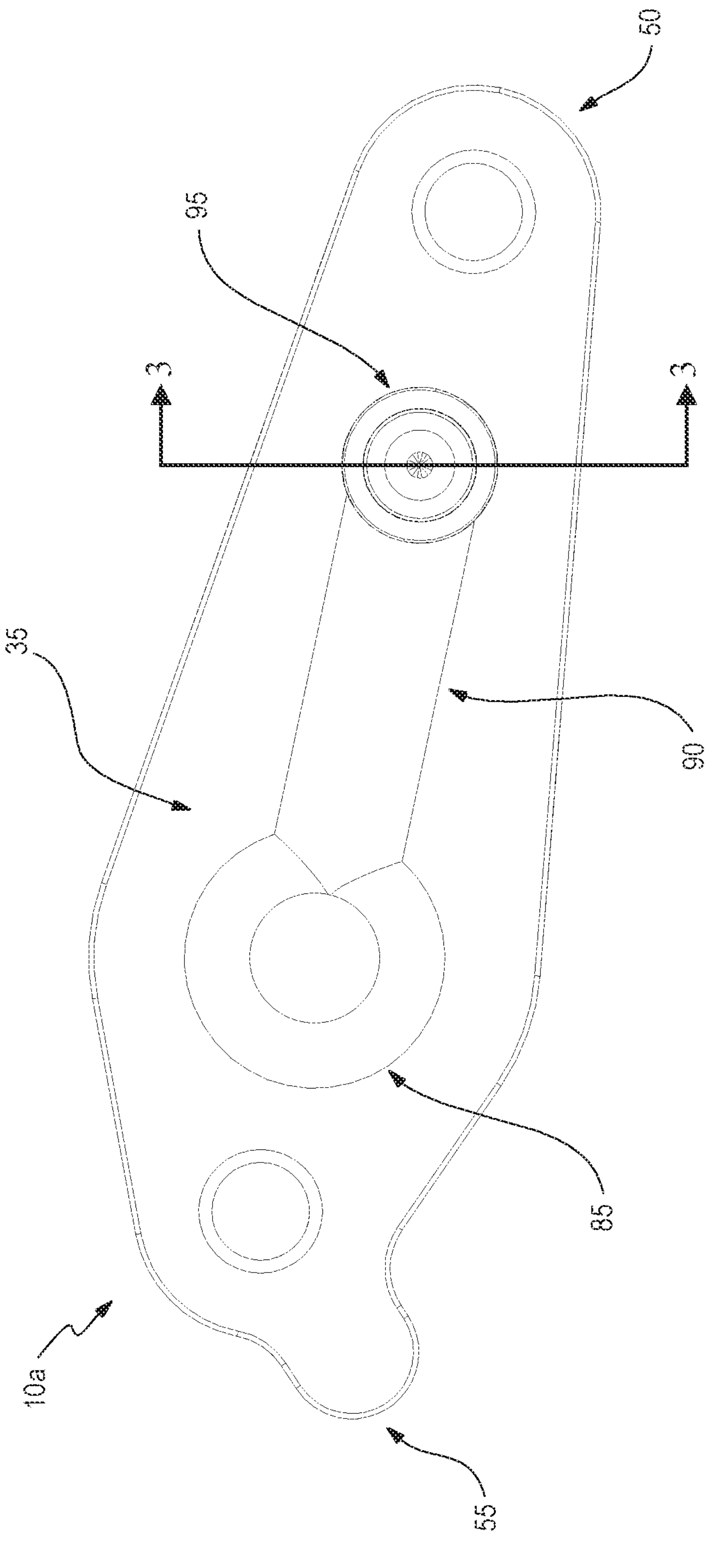
FIG. 2 is a rear elevation view of the piston cooling jet device of FIG. 1A.

As illustrated in FIGS. 1 and 2, the first orifice 15 and the second orifice 20 of each spray jet device 10*a* and 10*b* may be positioned and located on the main protrusion 60 proximate the distal end 70. The first orifice 15 and the second orifice 20 of each spray jet device 10*a* and 10*b* may be positioned and located approximately equidistant from the main body portion 25, although other configurations are foreseeable. Furthermore, the orifices 15 and 20 may be positioned and located on first outer surfaces 75 and a second outer surfaces 80 respectively. To facilitate drilling of the orifices 15 and 20 during manufacturing, the outer surfaces 75 and 80 may be substantially flat and oriented approximately perpendicular to the direction of oil discharge from the orifices 15 and 20.

The main protrusion 60 of each of the spray jet devices 10*a* and 10*b* may be integrally formed with the main body portion 25. For example, the main body portions 25 and the main protrusions 60 may be machined from a common part or formed together during a singular casting operation. To provide additional structural reinforcement, the spray jet devices 10*a* and 10*b* may each include a rounded portion 82 at the interface of the main body portion 25 and the main protrusion 60. As a result, the main protrusions 60 may be rigidly attached to the main body portions 25. Thus, the spray jet devices 10*a* and 10*b* are preferably less prone to damage when compared to known piston cooling jet devices. Additionally, due to the lack of assembly and the relative precision of machining, the spray jet devices 10*a* and 10*b* are preferably less prone to manufacturing inconsistencies when compared to known piston cooling jet devices.

Figure 3:
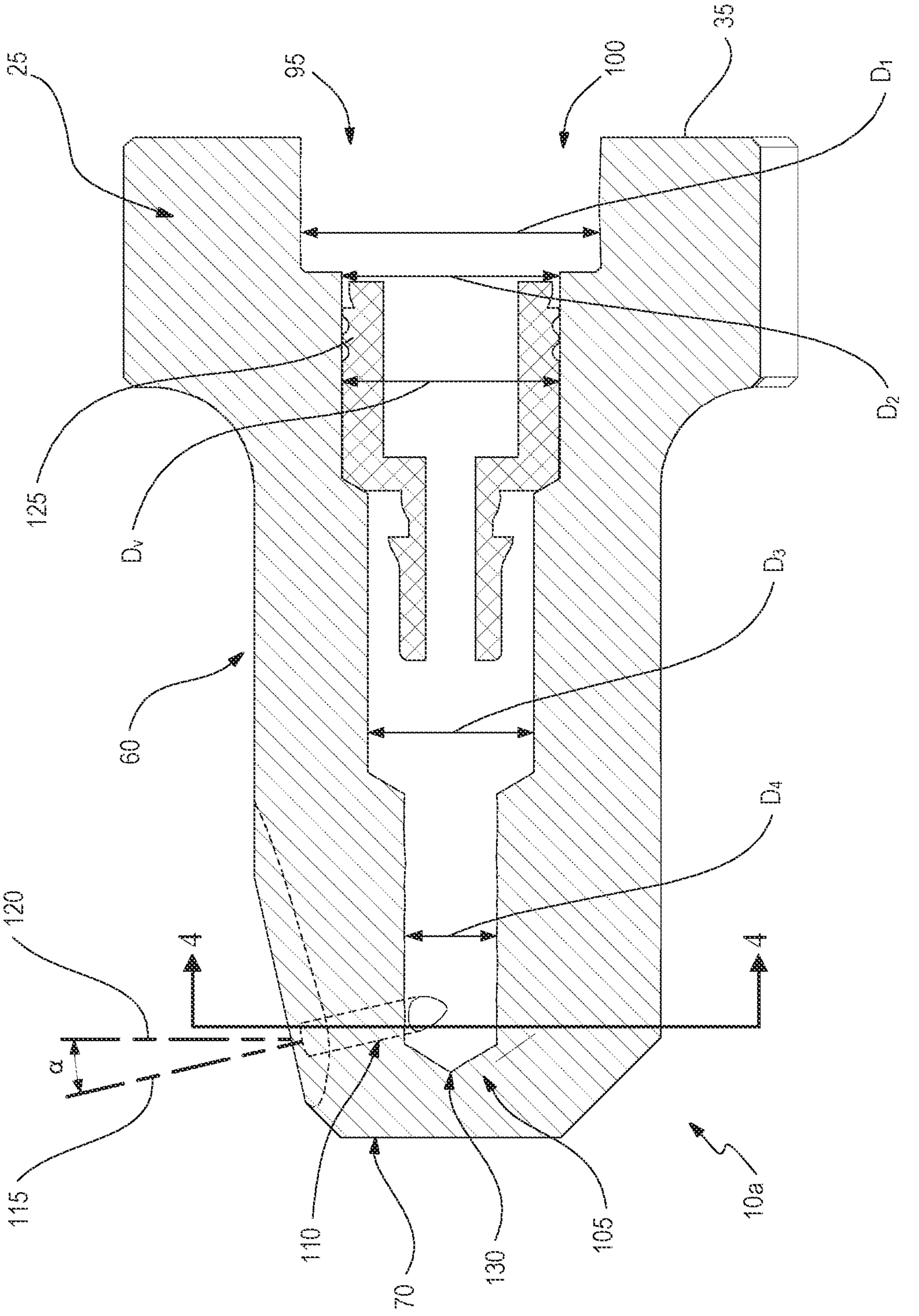
FIG. 3 is a sectional side view of the piston cooling jet device of FIG. 1A taken generally about line 3-3 (see FIG. 2) in the direction of the arrows.
Figure 4:
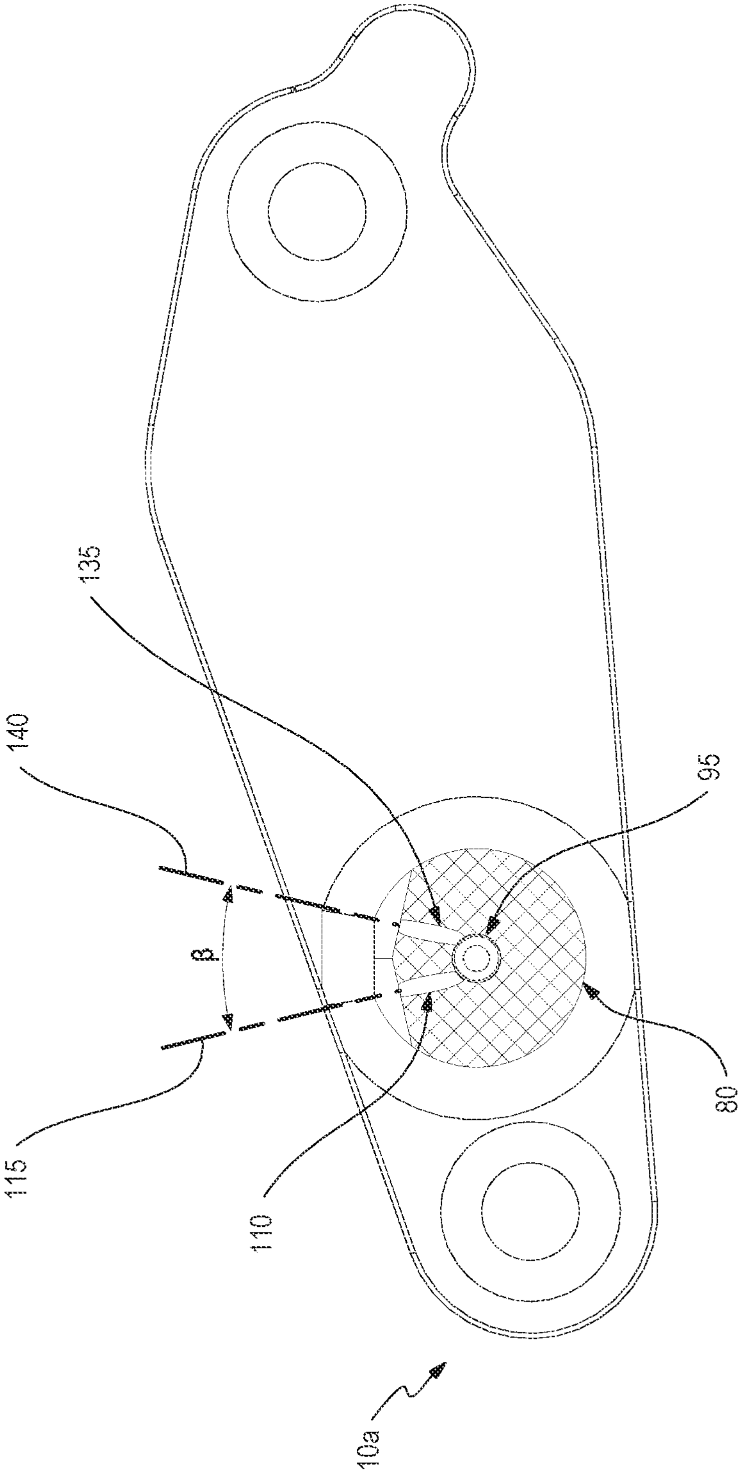
FIG. 4 is a sectional front view of the piston cooling jet device of FIG. 1A taken generally about line 4-4 (see FIG. 3) in the direction of the arrows.

FIGS. 2-4 illustrate specific features of the spray jet device 10*a*. It is to be understood, however, that the spray jet device 10*b* may include the features illustrated in FIGS. 2-4 as well. For example, in one embodiment, the spray jet device 10*b* may be a substantially mirror-image of the spray jet device 10*a*.

As best illustrated in FIG. 2, the rear surface 35 of the spray jet device 10*a* may be adapted to receive a fluid (e.g., oil or coolant). For example, a recess, chamber, or reservoir 85 for receiving oil may be positioned and located on the rear surface 35 proximate the second end 55. The reservoir 85 may be a hemispherical pocket in the rear surface 35, although other configurations are foreseeable.

The reservoir 85 may preferably intersect with a duct or channel 90 for conveying the oil to a tube, central bore, or fluid passageway 95 proximate the first end 50. Similar to the reservoir 85, the channel 90 may be a cavity in the rear surface 35 of the spray jet device 10*a*. The channel 90 may include a semi-circular cross-section which extends along a length of the channel 90 from the reservoir 85 to the fluid passageway 95. In alternative embodiments, however, the cross-section of channel 90 may be any suitable shape (e.g., rectangular cross-section, circular cross-section, etc.).

As illustrated in FIG. 2 and in greater detail in FIG. 3, the fluid passageway 95 may be adapted to convey oil from the channel 90. The fluid passageway 95 may preferably intersect with the channel 90 proximate to the rear surface 35 and may extend in a direction substantially perpendicular to the channel 90. More particularly, the fluid passageway 95 may be a cavity in the spray jet device 10*a* that extends in the axial direction into the main protrusion 60. The fluid passageway 95 may begin at an entrance portion 100 and may terminate at a terminal portion 105. The entrance portion 100 may be positioned and located proximate to the rear surface 35 of the main body portion 25, and the terminal portion 105 may be positioned and located proximate to the distal end 70 of the main protrusion 60.

Proximate the terminal portion 105, the spray jet device 10*a* may include a first branch 110 for conveying oil from the fluid passageway 95 to the first orifice 15 (see e.g., FIGS. 1A and 1B). The first branch 110 may be a cavity in the main protrusion 60 and may extend in a radial direction from the fluid passageway 95 to the first outer surface 75 (see e.g., FIGS. 1A and 1B). The first branch 110 may be substantially cylindrical, although other shapes for the first branch 110 are foreseeable.

As illustrated in FIG. 3, a first centerline 115 may pass through a central axis of the first branch 110. The first centerline 115 may define a first angle α relative to a vertical reference line 120. The first angle α may be between about −5° and about 30° in one embodiment, between about 5° and about 20° in another embodiment, between about 8° and about 18° in yet another embodiment, and about 13° or about 14° in further embodiments. In other alternative embodiments, the first angle α may be any suitable angle.

The spray jet device 10*a* may be adapted to selectively control fluid flow through the fluid passageway 95. For example, the fluid passageway 95 may be adapted to receive and retain a valve 125 therein. The valve 125 may be substantially cylindrical with a valve diameter $D_v$, although other shapes for the valve 125 are foreseeable. In some embodiments, the valve 125 may be a check valve, although other types of valves (i.e., pressure throttling valves) are foreseeable.

To allow the valve 125 to be placed within the fluid passageway 95, the entrance portion 100 of the fluid passageway 95 may include a first diameter $D_1$ positioned and located proximate to the rear surface 35. The first diameter $D_1$ may be larger than the valve diameter $D_v$, and therefore, the valve 125 may be inserted or removed from the fluid passageway 95 via the entrance portion 100. Adjacent to the first diameter $D_1$, the fluid passageway 95 may include a second diameter $D_2$ that is substantially the same size as or slightly smaller than the valve diameter $D_v$. Preferably, the second diameter $D_2$ may frictionally retain the valve 125 within the fluid passageway 95.

As further illustrated in FIG. 3, the fluid passageway 95 may include a third diameter $D_3$ positioned and located adjacent to the second diameter $D_2$, opposite the first diameter $D_1$. In some embodiments, the third diameter $D_3$ may be smaller than the valve diameter $D_v$. As a result, the third diameter $D_3$ may preferably prevent the valve 125 from translating towards the terminal portion 105 of the fluid passageway 95. Thus, the third diameter $D_3$ may preferably prevent the valve 125 from blocking fluid communication to the first branch 110.

The fluid passageway 95 may also include a fourth diameter $D_4$ positioned and located proximate the terminal portion 105 and adjacent to the third diameter $D_3$. The fourth diameter $D_4$ may be smaller than the first diameter $D_1$, the second diameter $D_2$, and the third diameter $D_3$. Accordingly, the fluid passageway 95 may decrease in size from the entrance portion 100 to the terminal portion 105. As a result, the velocity of the oil may increase as it flows through the fluid passageway 95 towards the first branch 110. Advantageously, the increasing velocity of the oil at the terminal portion 105 may facilitate laminar flow in the first branch 110 and, thus, jet-like discharge of the oil from the first orifice 15 (see e.g., FIGS. 1A and 1B).

Proximate the terminal portion 105, the fourth diameter $D_4$ may taper to a tip 130. The tip 130 may be configured to collect solid particles entrapped in the oil. For example, proximate an intersection of the fluid passageway 95 and the first branch 110, the direction of the flow of oil may transition from the axial direction to the radial direction. However, the inertia of the solid particles may cause the solid particles to continue in the axial direction. Accordingly, the solid particles entrapped in the oil may travel to the pointed tip 130 and collect therein.

Turning to FIG. 4, the spray jet device 10*a* may also include a second branch 135 that is substantially similar to the first branch 110. The second branch 135 may extend from the fluid passageway 95 to the second outer surface 80 (see e.g., FIGS. 1A and 1B) of the of the main protrusion 60. As illustrated, a second centerline 140 may pass through a central axis of the second branch 135. The second centerline 140 may define a second angle β with respect to the first centerline 115 of the first branch 110. The second angle β may be between about 15° and about 45° in one embodiment, between about 20° and about 40° in another embodiment, between about 25° and about 35° in yet another embodiment, and about 30° in further embodiments. In additional alternative embodiments, the second angle β may be any suitable angle.

Although not illustrated herein, the spray jet device 10*b* may include the features described and illustrated herein with reference to the spray jet device 10*a*. For example, the spray jet device 10*b* may include a reservoir 85, a channel 90, and a fluid passageway 95. The fluid passageway 95 may intersect with a first branch 110 and a second branch 135. A centerline 115 of the first branch 110 and a centerline 140 of the second branch 135 may each define a first angle α relative to a vertical reference line 120. Furthermore, the centerlines 115 and 140 may define a second angle β relative to one another. The first branch 110 and second branch 135 may terminate at the first orifice 15 and the second orifice 20 respectively.

Figure 5:
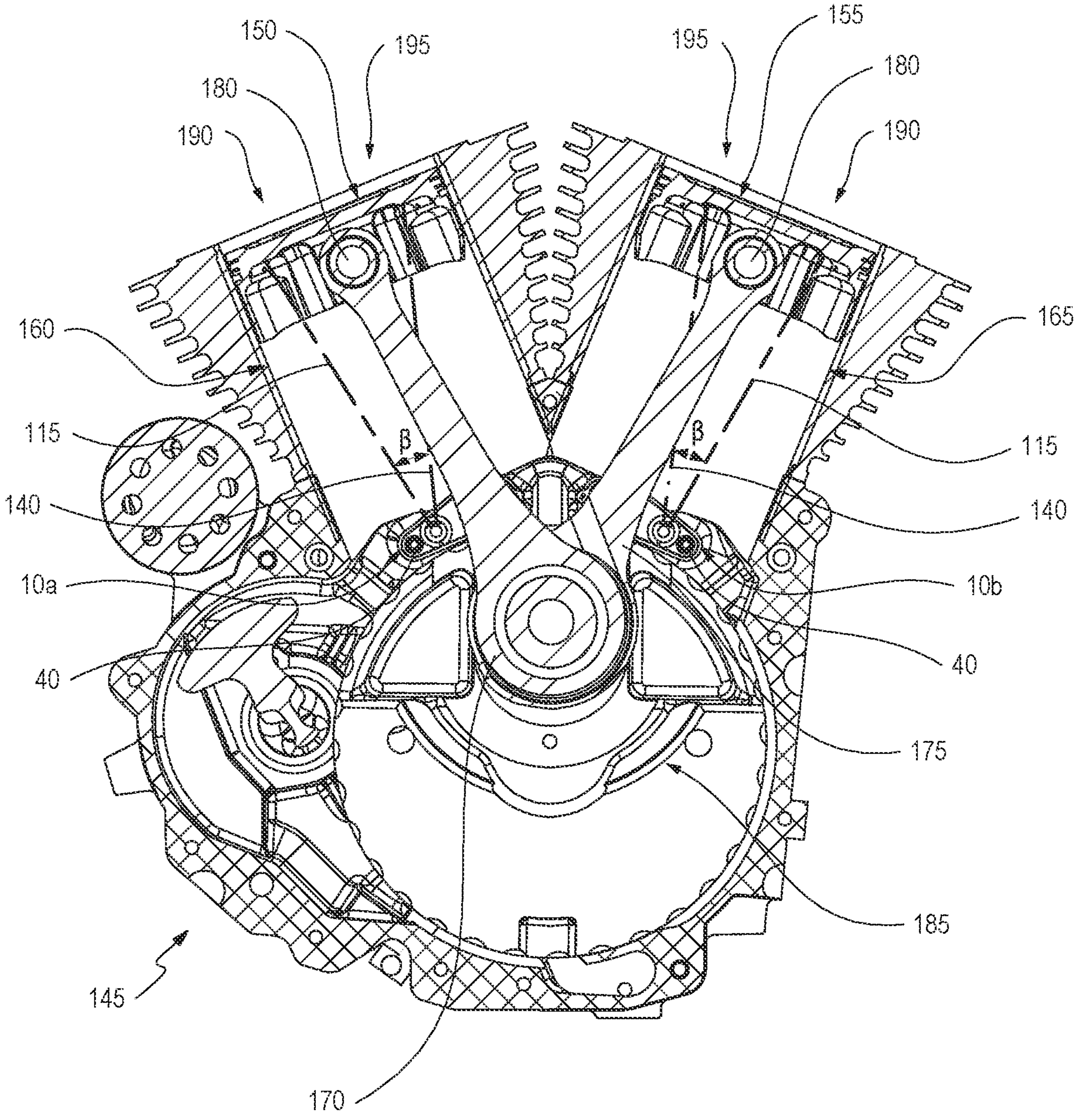
FIG. 5 is a schematic sectional side view of an engine including the piston cooling jet devices of FIGS. 1A and 1B and pistons in accordance with one embodiment of the present invention, the pistons in a top-dead-center position.
Figure 6:
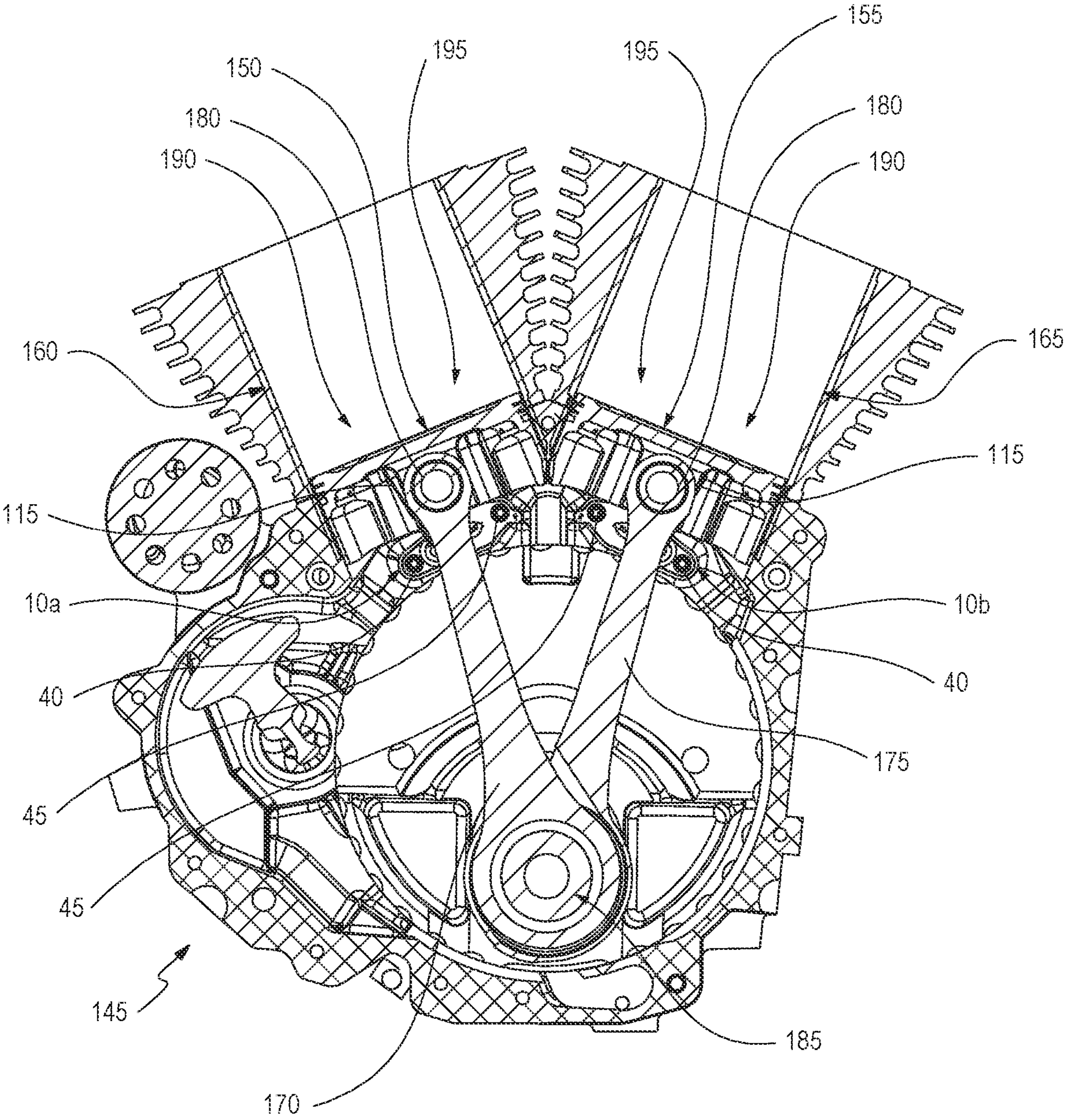
FIG. 6 is a schematic sectional side view of the engine of FIG. 5 with the pistons in a bottom-dead-center position.

Turning to FIGS. 5 and 6, the spray jet devices 10*a* and 10*b* may be coupled to an engine 145. More particularly, the spray jet devices 10*a* and 10*b* may be selectively coupled to the engine 145 via the first fastening holes 40 and the second fastening holes 45. In alternative embodiments, the spray jet devices 10*a* and 10*b* may be further or instead coupled to the engine 145 via other suitable means (e.g., welding). In yet other embodiments, the spray jet devices 10*a* and 10*b* may include gaskets or O-rings for interfacing with the engine 145.

The engine 145 may be a motorcycle engine or more specifically, a V-twin motorcycle engine as illustrated. In alternative embodiments, however, the engine 145 may be another type of motorcycle engine (e.g., a single-cylinder motorcycle engine, a parallel-twin motorcycle engine, or other multicylinder motorcycle engine) or the engine may be configured for another application (e.g., automotive, heavy machinery, marine, or electrical generation).

The engine 145 may include an oil supply system (not illustrated) for supplying oil to various components in the engine 145. The oil supply system may include outlets (not illustrated) for supplying oil to the spray jet devices 10*a* and 10*b* and an oil pump (not illustrated) for circulating oil through the system. The spray jet devices 10*a* and 10*b* may be positioned and located on the engine 145 to receive oil from the oil supply system. For example, the reservoirs 85 (see e.g., FIG. 2) may abut and surround the outlets of the oil supply system and, the reservoirs 85 may be substantially the same size as or slightly larger than the outlets When the engine 145 is running, the oil pump may circulate oil to the outlets of the oil supply system. As the oil exits through the outlets, the oil may enter the reservoirs 85 and flow through the channels 90 (see e.g., FIG. 2) into the fluid passageways 95 (see e.g., FIGS. 2-4). During start-up of the engine 145 and the oil pump, oil may be supplied at a lower flowrate and pressure when compared to steady-state operation. As a result, the pressure of the oil during start-up may be less than a threshold pressure or cracking pressure of the valves 125 (see e.g., FIG. 3). Accordingly, the valves 125 may preferably prevent oil from flowing through the fluid passageways 95 during start-up of the oil pump.

When the oil pump reaches steady-state operation, the pressure of the oil in the oil supply system may be greater than the threshold pressure of the valves 125. Accordingly, the valves 125 may allow oil to flow through the fluid passageways 95. As a result, during steady-state operation of the oil pump, oil may flow to the branches 110 and 135 (see e.g., FIGS. 3 and 4), and oil may be discharged from the first orifices 15 and the second orifices 20 (see e.g., FIGS. 1 and 2).

A front piston 150 and a rear piston 155 of the engine 145 may be positioned and located above the spray jet devices 10*a* and 10*b* respectively. The front piston 150 and the rear piston 155 may be retained within a front cylinder 160 and a rear cylinder 165 of the engine 145 respectively. The front piston 150 and the rear piston 155 may be pivotably coupled to a front connecting rod 170 and a rear connecting rod 175 respectively via piston pins 180. The connecting rods 170 and 175 may further be coupled a crank mechanism 185 of the engine 145 to convert the reciprocating motion of the pistons 150 and 155 to rotary motion. As a result, the pistons 150 and 155 may oscillate in the cylinders 160 and 165 between a top-dead-center position and a bottom-dead-center position.

As illustrated in FIG. 5, when the pistons 150 and 155 are in the top-dead-center position, the centerlines 115 of the first orifices 15 may be directed at an exhaust side portion 190 of the pistons 150 and 155. Additionally, in the top-dead-center position, the centerlines 140 of the second orifices 20 may be directed at an intake side portion 195 of the pistons 150 and 155. Accordingly, when the pistons 150 and 155 are in the top-dead-center position and the oil pump is in steady-state operation, the spray jet devices 10*a* and 10*b* may preferably spray oil onto the exhaust side portions 190 and the intake side portions 195 of the pistons 150 and 155.

As the pistons 150 and 155 translate from the top-dead-center position to the bottom dead-center position, the pistons 150 and 155 may translate relative to the centerlines 115 and 140. Nevertheless, the centerlines 115 and 140 may remain directed at the intake side portions 195 and the exhaust side portions 190. For example, as the pistons 150 and 155 move towards the bottom-dead-center position, the pistons 150 and 155 may translate such that the centerlines 115 and 140 are directed more radially inwards (i.e., towards the piston pins 180) when compared to the top-dead-center position. Thus, the spray jet devices 10*a* and 10*b* may preferably continue to spray oil onto the pistons 150 and 155 as they oscillate between the top-dead-center position and the bottom-dead-center position.

As illustrated in FIG. 6, when the pistons 150 and 155 reach the bottom-dead-center position, the centerlines 115 of the first orifices 15 may remain directed at the exhaust side portions 190 of the pistons 150 and 155. However, the centerlines 140 (see e.g., FIG. 5) of the second orifices 20 may be directed at the connecting rods 170 and 175, as opposed to the intake side portions 195 of the pistons 150 and 155. In alternative embodiments, however, the engine 145 and the spray jet devices 10*a* and 10*b* may be adapted such that the centerlines 140 remain directed at the intake side portions 195 instead of or in addition to the centerlines 115 being directed at the exhaust side portions 190. For example, in some alternative embodiments, the position of the spray jet devices 10*a* and 10*b*, the geometry of the connecting rods 170 and 175, the geometry of the pistons 150 and 155, and/or the angles α and β may be adapted such that the centerlines 115 and 140 remain directed at the pistons 150 and 155 in the bottom-dead-center position.

From the accompanying materials, it will be seen that the invention is one well adapted to attain all the ends and objects set forth herein with other advantages which are obvious and which are inherent to the structure. It will be understood that certain features and subcombinations are of utility and may be employed without reference to other features and subcombinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described in the accompanying materials and illustrated in the drawings are presented by way of example only and are not intended to limit the concepts and principles of the present invention. Thus, there has been shown and described several embodiments of a novel invention. As is evident from the description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A spray jet device for use with an engine and configured for spraying a fluid, the spray jet device comprising:

a main body portion having a first surface and a second surface positioned and located on opposing sides of the main body portion;

an inlet reservoir configured to receive the fluid, the inlet reservoir formed in the first surface;

a main protrusion extending outwardly from the second surface;

a fluid passageway in fluid communication with the inlet reservoir, the fluid passageway defined in the main protrusion and extending along an axial direction, the fluid passageway having a first end proximate the main body portion and a second end opposite from the first end;

a first branch and a second branch defined as cavities in the main protrusion;

wherein the first branch and the second branch each begin at the fluid passageway proximate the second end; and wherein the first branch and the second branch each extend outwardly from the fluid passageway in a radial direction with respect to the main protrusion.

2. The spray jet device of claim 1, wherein the main protrusion is integrally formed with the main body portion.

3. The spray jet device of claim 1, wherein an angle between a centerline of a central axis of the first branch and a centerline of the central axis of the second branch is between about 15 degrees and about 45 degrees.

4. The spray jet device of claim 1, wherein the fluid passageway further includes:

a first diameter proximate the first end;

a second diameter proximate the second end; and wherein the first diameter is larger than the second diameter.

5. The spray jet device of claim 1, wherein the second end of the fluid passageway includes a pointed tip configured to collect solid particles entrapped in the fluid.

6. The spray jet device of claim 1, wherein the first branch terminates at a first outer surface positioned and located on the main protrusion.

7. A spray jet device for use with an engine, the spray jet device comprising:

a body portion having a front surface and a rear surface;

a protrusion extending outwardly from the front surface of the body portion in an axial direction;

a fluid passageway defined in the protrusion and the body portion, the fluid passageway extending through the protrusion along the axial direction;

a check valve positioned and located in the fluid passageway;

at least one branch defined as a cavity in the protrusion, the at least one branch extending from the fluid passageway to an outer surface of the protrusion;

a fluid reservoir formed as a pocket in the rear surface of the body portion;

a channel formed as a pocket in the rear surface of the body portion, the channel extending from the fluid reservoir to the fluid passageway; and wherein the front surface and the rear surface are positioned and located on opposing sides of the body portion from one another such that the protrusion and the fluid reservoir are positioned and located opposing one another.

8. The spray jet device of claim 7, wherein the fluid reservoir is a hemispherical cavity, and wherein the channel includes a semi-circular cross-section that extends between the fluid reservoir and the fluid passageway.

9. The spray jet device of claim 7, wherein the spray jet device includes a plurality of branches extending from the fluid passageway.

10. The spray jet device of claim 7 wherein:

the check valve includes a valve diameter;

the fluid passageway includes an inner diameter proximate the body portion and an outer diameter proximate the at least one branch; and the valve diameter is smaller than the inner diameter but larger than the outer diameter.

11. The spray jet device of claim 7, wherein an angle between a vertical reference line and a centerline of a central axis of the at least one branch is between about −5 degrees and about 30 degrees.

12. A piston mechanism comprising: a cylinder; a piston positioned and located within the cylinder, the piston having an intake side portion and an exhaust side portion; a spray jet device including: a main body portion having a front surface and a rear surface positioned and located on opposing sides of the main body portion; a main protrusion extending outwardly from the front surface in a direction substantially perpendicular to the front surface or the rear surface; a first orifice and a second orifice positioned and located on the main protrusion; a reservoir positioned and located on the rear surface of the main body portion, the reservoir configured to receive the fluid conveyed by the oil supply system; a channel extending along the rear surface of the main body portion, the channel configured to convey the fluid received by the reservoir; and a fluid passageway fluidly coupling the channel to the first orifice and the second orifice to convey fluid from the channel to the first orifice and the second orifice, the fluid passageway extending through the main body portion and the main protrusion in a direction substantially perpendicular to the front surface and the rear surface; an oil supply system configured to convey a fluid to the rear surface of the spray jet device; wherein the piston is movable between a top-dead-center position and a bottom-dead-center position; wherein when the piston is in the top-dead-center position, the first orifice is directed generally at the exhaust side portion of the piston; wherein when the piston is in the top-dead-center position, the second orifice is directed generally at the intake side portion of the piston.

13. The piston mechanism of claim 12, wherein when the piston is in the bottom-dead-center position, the first orifice or the second orifice is directed at the intake side portion or the exhaust side portion of the piston.

14. The piston mechanism of claim 12, wherein the spray jet device is configured to spray a fluid from the first orifice and the second orifice onto an underside of the piston to cool the piston.

15. The piston mechanism of claim 12, wherein the first orifice and the second orifice are approximately equidistant from the main body portion.

16. The piston mechanism of claim 12, wherein the spray jet device includes at least one fastening hole configured to couple the main body portion of the spray jet device to the cylinder.

17. The piston mechanism of claim 12, wherein the main protrusion of the spray jet device is integrally formed with the main body portion.

18. The spray jet device of claim 1, wherein the main protrusion extends outwardly in the axial direction from the second surface such that the fluid passageway extends through the main protrusion in the same direction that the main protrusion extends outwardly from the main body portion.

19. The spray jet device of claim 1, wherein the main body portion is a substantially flat body such that the first surface and the second surface are oriented generally parallel to one another, and wherein the main protrusion is an elongated body extending in a direction generally perpendicular to the first surface and the second surface.

20. The spray jet device of claim 7, wherein the reservoir is provided as a hemispherical pocket extending only partially into the main body portion.

21. The spray jet device of claim 7, wherein the fluid passageway extends in a first direction, and wherein the channel extends in a direction generally perpendicular to the first direction.

22. The piston mechanism of claim 12, further comprising a connecting rod pivotably coupled to the piston, wherein the intake side portion is adjacent to a first side of the connecting rod, and wherein the exhaust side portion is adjacent to a second side of the connecting rod.

* * * * *